US011301261B2

United States Patent
Bhuiyan et al.

(10) Patent No.: US 11,301,261 B2
(45) Date of Patent: Apr. 12, 2022

(54) SYSTEM AND METHOD FOR DISPLAYING AN IMAGE THROUGH A PLATFORM INITIALIZATION PROCESS

(71) Applicant: Dell Products L.P., Round Rock, TX (US)

(72) Inventors: Ruhull Alam Bhuiyan, Austin, TX (US); Carl Claude McAdams, Round Rock, TX (US); Amit Kumar Tiwari, Austin, TX (US); Frank Quintanilla, III, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 240 days.

(21) Appl. No.: 16/660,180

(22) Filed: Oct. 22, 2019

(65) Prior Publication Data

US 2021/0117205 A1 Apr. 22, 2021

(51) Int. Cl.
*G06F 9/4401* (2018.01)
*G06F 9/445* (2018.01)

(52) U.S. Cl.
CPC ........ *G06F 9/4408* (2013.01); *G06F 9/44505* (2013.01); *G06F 9/44536* (2013.01)

(58) Field of Classification Search
None
See application file for complete search history.

(56) References Cited

U.S. PATENT DOCUMENTS

| 10,402,204 | B1* | 9/2019 | Yakovlev | G06F 3/0665 |
| 2016/0378686 | A1* | 12/2016 | Adams | G06F 9/4401 |
| | | | | 713/2 |

FOREIGN PATENT DOCUMENTS

CN 106951358 * 7/2017

OTHER PUBLICATIONS

English Translation of the Chinese document (Year: 2017).*

* cited by examiner

*Primary Examiner* — Fahmida Rahman
(74) *Attorney, Agent, or Firm* — Baker Botts L.L.P.

(57) ABSTRACT

A disclosed information handling system is configured to display a consistent logo or image throughout a platform initialization process. In a first-time boot, in a DXE phase, image information is read from firmware storage and processed for native resolution for a display panel and HOB information is saved to firmware volumes with Hand-Off Block (HOB) information. In subsequent iterations of the platform initialization process, the processed image is displayed early in a PEI phase and the HOB information is stored with the processed image. The image is displayed throughout the DXE and BDS phases of each subsequent platform initialization process and the display is consistent for different information handling systems and display panels.

18 Claims, 5 Drawing Sheets

SYSTEM AND METHOD FOR DISPLAYING AN IMAGE THROUGH A PLATFORM INITIALIZATION PROCESS

BACKGROUND

Field of the Disclosure

This disclosure relates generally to information handling systems and, more particularly, to systems and methods for displaying an image through a platform initialization process.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

As the demands for better customer experience with information handling systems continues to increase, users expect faster and more responsive systems. In an information handling system going through a platform initialization process, a blank display provides no information to a user and a flickering display can give a user a false perception that the system is not working properly.

Embodiments disclosed herein are generally directed to a computer implemented method for displaying an image on an information handling system throughout a platform initialization process. The method is performed during a Pre-Extensible Firmware Interface (EFI) Initialization (PEI) phase, a Driver Execution Environment (DXE) phase and a Boot Device Selection (BDS) phase. During a PEI phase, embodiments determine, from a Hand-Off Block (HOB), if an image is contained in a firmware volume. If the firmware volume contains an image, a PEI module (PEIM) processes the image for native resolution to a display panel. In a Driver Execution Environment (DXE) phase, embodiments determine if a firmware volume contains an image. If the firmware volume contains an image, embodiments execute a DXE driver for processing the image for native resolution to a display panel. In a Boot Device Selection (BDS) phase, embodiments determine if a HOB for an image is present. If no HOB for an image is present (such as in a first execution of a platform initialization process), embodiments set an image resolution for a display panel; clear the display panel; process an image for native resolution to the display panel; flush an image page; and store image information for the processed image in a firmware volume. If a HOB for an image is present, embodiments locate image information from the image HOB; load the processed image from the firmware volume; and process the image for native resolution to the display panel. In the BDS phase, embodiments determine if a hotkey is pressed. If no hotkey is pressed, embodiments save image information to a Boot Graphics Resource Table (BGRT). If a hotkey is pressed, embodiments load a screen frame buffer; create an image page; and process the image for native resolution to the display panel.

In some embodiments, setting an image resolution for a display panel, clearing the display panel, processing an image for native resolution to a display panel, flushing an image page and storing the processed image in a firmware volume are executed in an initial execution of the platform initialization process. In some embodiments, loading the processed image from the firmware volume, displaying the processed image matching a current active display panel and storing a Hand-Over Block (HOB) with the processed image information are executed in a subsequent execution of the platform initialization process. In some embodiments, a Globally Unique Identifier (GUID) is created for the image HOB. In some embodiments, the HOB information is saved to a Boot Graphics Resource Table (BGRT) before exiting the BDS phase. In some embodiments, a screen frame buffer is loaded; an image page is created and a progress bar is displayed before exiting the BDS phase. In some embodiments, the display panel comprises a Timing Controller (TCON) panel.

Embodiments disclosed herein are generally directed to an information handling system comprising a processor, a memory subsystem adapted to store firmware volumes and an I/O subsystem comprising a display panel. During a Pre-Extensible Firmware Interface (EFI) Initialization (PEI) phase of a platform initialization process, the processor determines, from a Hand-Off Block (HOB), if an image is contained in a firmware volume in a storage device coupled to the processor. If the firmware volume contains an image, a PEI module (PEIM) processes the image for native resolution to a display panel in an input/output (I/O) subsystem. During a Driver Execution Environment (DXE) phase, the processor determines if a firmware volume in the storage device contains an image If the firmware volume contains an image, the processor executes a DXE driver for processing the image for native resolution to a display panel. During in a Boot Device Selection (BDS) phase, the processor determines if a HOB for an image is present If no HOB for an image is present, the processor sets an image resolution for the display panel; clears the display panel; processes an image for native resolution to the display panel; flushes an image page and stores image information for the processed image in the firmware volume. If a HOB for an image is present, the processor locates image information from the processed image HOB, loads the processed image from the firmware volume based on the processed image HOB and processes the image for native resolution to the display panel. In some embodiments, in the BDS phase, the processor is further configured to determine if a hotkey is pressed. If no hotkey is pressed, the processor saves image information to a Boot Graphics Resource Table (BGRT). If a hotkey is pressed, the processor loads a screen frame buffer, creates an image page and processes the image for native resolution to the display panel. In some embodiments, the processor sets an image resolution for a display panel, clears the display panel, processes an image for native resolution to a display panel, flushes an image page and stores the processed image in a firmware volume in an initial execution of the platform initialization process. In some embodiments, the processor loads the processed image from the firmware volume, displays the processed image matching a current active display panel and stores a Hand-Over Block (HOB) with the processed image in a subsequent execution of the platform initialization process. In some embodiments, the processor creates a Globally Unique Identifier (GUID) for the image HOB. In some embodiments, the processor saves the HOB information to a Boot Graphics Resource Table (BGRT) before exiting the BDS phase. In some embodiments, the processor loads a screen frame buffer, creates an image page and displays a progress bar before exiting the BDS phase. In some embodiments, the display panel comprises a Timing Controller (TCON) panel.

Embodiments disclosed herein are generally directed to at least one non-transitory, computer-readable medium storing program instructions. When executed by a processor, the instructions cause the processor to display an image throughout a platform initialization process. In a first platform initialization process in a Boot Device Selection (BDS) phase, the instructions cause the processor to set a native resolution for an image based on a display panel; clear the display panel; process image information for native resolution of the image to the display panel; and store the processed image information in a firmware volume. In subsequent platform initialization processes in a Pre-Extensible Firmware Interface Initialization (PEI) phase, the instructions cause the processor to identify the processed image in the firmware volume; load the processed image from the firmware volume; display the processed image matching a current active panel; and store a Hand-Over Block (HOB) associated with the processed image. In platform initialization processes in a Driver Execution Environment (DXE) phase, the instructions cause the processor to receive the HOB associated with the processed image from the PEI phase; execute a DXE driver to continue displaying the processed image and store the HOB associated with the processed image in the firmware volume. In a Boot Device Selection phase, the instructions cause the processor to locate image information from the HOB associated with the processed image, process the image information from the HOB associated with the processed image to continue displaying the processed image and store image information for the processed image in a firmware volume. In some embodiments, the information handling system is coupled to an external monitor, wherein the image is displayed on the external monitor. In some embodiments, one or more of the information handling system monitor and the external the monitor comprises a bitmap-enabled Timing Controller (TCON) panel.

Embodiments disclosed herein may be configured to process and store an image in firmware during a first platform initialization process such that the processed image can be reused early in the PEI phase and throughout the DXE and BDS phases in subsequent platform initialization processes.

Users see an image early in the platform initialization process, the image is consistent across different systems and monitors, and implementation is less expensive than TCON panels and other approaches. As a result, users have greater confidence that an information handling system is operating as expected and greater satisfaction with more consistent results even across various systems and displays.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) systems, such as a keyboard, a mouse, and a video display. The information handling system may also include one or more buses operable to transmit communication between the various hardware components.

Particular embodiments are best understood by reference to FIGS. 1-5, where like numbers are used to indicate like and corresponding parts.

Figure 1:
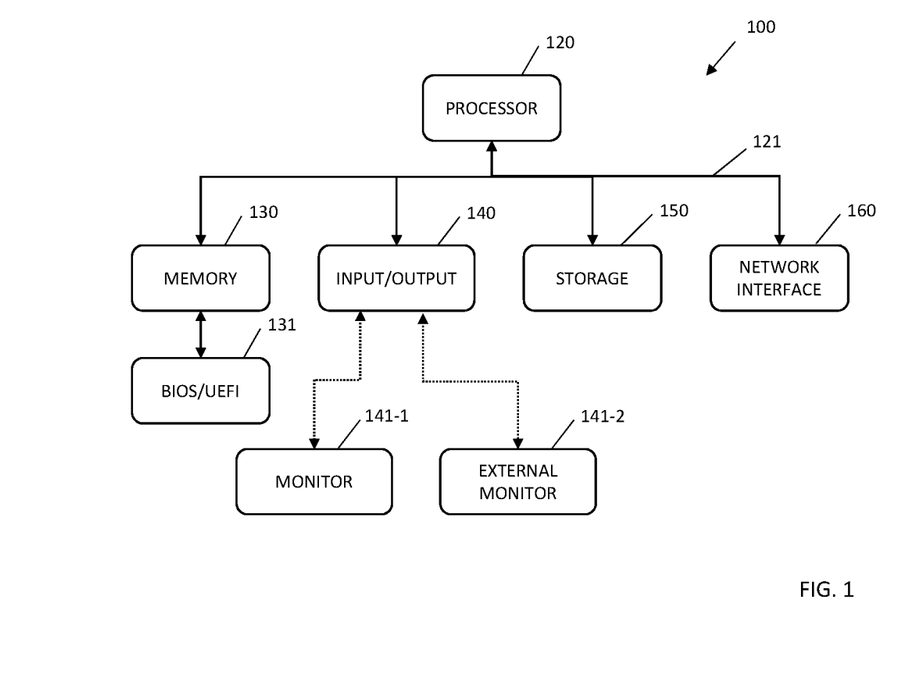
FIG. 1 is a block diagram depicting selected elements of an information handling system for displaying an image in a platform initialization process.

Turning now to the drawings, FIG. 1 illustrates a block diagram depicting selected elements of an embodiment of information handling system 100. As described herein, information handling system 100 may represent a personal computing device, such as a personal computer system, a desktop computer, a laptop computer, a notebook computer, etc., operated by a user. In various embodiments, information handling system 100 may be operated by the user using a keyboard and a mouse (not shown).

As shown in FIG. 1, components of information handling system 100 include, but are not limited to, processor subsystem 120, comprising one or more processors, and system bus 121 that communicatively couples various system components to processor subsystem 120 including, for example, a memory subsystem 130, an I/O subsystem 140, local storage resource 150, and a network interface 160.

As depicted in FIG. 1, processor subsystem 120 comprises a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 interprets and/or executes program instructions and/or process data stored locally (e.g., in memory subsystem 130). In the same or alternative embodiments, processor subsystem 120 interprets and/or executes program instructions and/or process data stored remotely (e.g., in a network storage resource, not shown).

System bus 121 refers to any of a variety of bus structures, e.g., a memory bus, a peripheral bus, or a local bus enabling communication between components in an information handling system. Examples of bus architectures include Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, memory subsystem 130 comprises a system, device, or apparatus operable to retain and/or retrieve program instructions and/or data for a period of time (e.g., computer-readable media). In some embodiments, memory subsystem 130 comprises random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down. BIOS/UEFI 131 is stored on non-volatile memory 130 and includes program instructions stored thereon. Those instructions may be usable by processor(s) 120 to initialize and test other hardware components and/or to load an Operating System (OS) onto information handling system 100. As such, (BIOS/UEFI) 131 includes a firmware interface that allows processor(s) 120 to load and execute certain firmware, as described in more detail below. In some embodiments, such firmware may include program code that is compatible with the Unified Extensible Firmware Interface (UEFI) specification, although other types of firmware may be used.

As depicted in FIG. 1, input/output (I/O) subsystem 140 comprises a monitor or other display panel for displaying information. In some embodiments, I/O subsystem 140 includes a second display panel such as external monitor 141 for displaying information. I/O subsystem 140 is communicatively coupled to processor subsystem 120 via bus 121 and information handling system 100 may be configured for displaying information to one or more display panels 141. For example, a laptop information handling system may have monitor 141-1 and be coupled to external monitor 141-2. Display panels 141 may include other systems and devices for displaying information. Each display panel 141 in I/O subsystem 140 may have different resolutions. Embodiments disclosed herein are configured to identify a native resolution for a display panel and process images for displaying on a display panel based on a native resolution of that display panel. Embodiments disclosed herein are further adapted to clear a display panel to ensure no artifacts from other processing remains visible on the display panel. In some embodiments, a display panel comprises a bitmap-enabled Timing Controller (TCON) panel or a projector.

Also coupled to memory bus 121 is storage device or storage 150 within which can be stored one or more software and/or firmware modules and/or data (not specifically shown). In one embodiment, storage 150 can be a hard drive or a solid-state drive. The one or more software and/or firmware modules within storage 150 can be loaded into system memory 130 during operation of information handling system 100. Local storage resource 150 comprises any combination of one or more computer readable storage device(s). The computer readable storage device may be, for example, but not limited to, an electronic, magnetic, optical, electromagnetic, infrared, or semiconductor system, apparatus, or device, or any combination of the foregoing. More specific examples (a non-exhaustive list) of the computer readable storage device include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination of the foregoing. In the context of this document, a computer readable storage device may be any tangible medium that can contain, or store a program for use by or in connection with an instruction execution system, apparatus, or device. In information handling systems with Unified Extended Firmware interface (UEFI), a physical flash device firmware volumes (FVs) organized into a Firmware File System (FFS) are stored in a storage device. Firmware volumes can be subdivided into sections, including portable executable (PE) file format.

In FIG. 1, network interface 160 comprises a system, apparatus, or device operable to serve as an interface between information handling system 100 and a network (not shown). Network interface 160 enables information handling system 100 to communicate over the network using a transmission protocol and/or standard. In some embodiments, network interface 160 is communicatively coupled via a network to a network storage resource (not shown). A network coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). A network coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. A network coupled to network interface 160 and/or various components associated therewith may be implemented using hardware, software, or any combination thereof.

When information handling system 100 is started or powered up using a UEFI interface, information handling system 100 goes through several platform initialization (PI) boot phases, including Security (SEC), Pre-EFI Initialization (PEI), Driver Execution Environment (DXE), Boot Device Selection (BDS) and Transient System Load (TSL) before operating in Run Time (RT) and before shutting down in After Life (AL). Embodiments disclosed herein are described as they pertain to the PEI, DXE and BDS phases of the platform initialization process.

In many information handling systems, a platform initialization process executes for approximately 6-8 seconds before an image or logo is displayed, which causes users to wonder if the information handling system is operating properly. Various approaches have been developed to address user concerns during execution of a platform initialization process. In commercial, gaming and other high-end information handlings systems, built-in bitmap-enabled Timing Controller (TCON) panels are adapted to display logos and other images during the platform initialization process. The capability to present a logo or image in the platform initialization process is desirable from a customer experience standpoint, but the cost associated with TCON panels is generally not compatible for generalized and less expensive information handling systems. In other information handling systems, during a platform initialization process, platform specific alerts (light-emitting diodes (LEDs), keyboard backlight, screen glow, speaker noise, etc.), are included to notify the user that the system is operating. However, LEDs add cost but provide limited information as to the status of the system and fans and speakers may indicate there is power, but a software stack is not active in any of these approaches. As such, in these systems, if the screen flickers or there is a delay presenting the logo, users may wonder if the information handling system is functioning properly even if there is an LED or other indicator that the system is operating as expected.

One issue with displaying logos and other images is that the display of a logo or image depends on the information handling system configuration. The display of an image depends if the information handling system is a laptop, desktop or some other type of information handling system and also depends if the image is being presented on an information handling system monitor or displayed on an external monitor or projector. In systems with built in images implemented using TCON panels, the system is generally vendor-specific such that no scaling or customization is possible and there is typically a visual effect when transitioning from a TCON image to a DxE image. Thus, the special parts and additional cost associated with a proprietary approach do not guarantee accurate location and dimensioning of an image after the firmware is active and do not contribute to a better user experience.

Embodiments disclosed herein include systems and methods for displaying an image early in a platform initialization process and maintaining a consistent image throughout the platform initialization process, without requiring expensive or specialized hardware or components.

Figure 2:
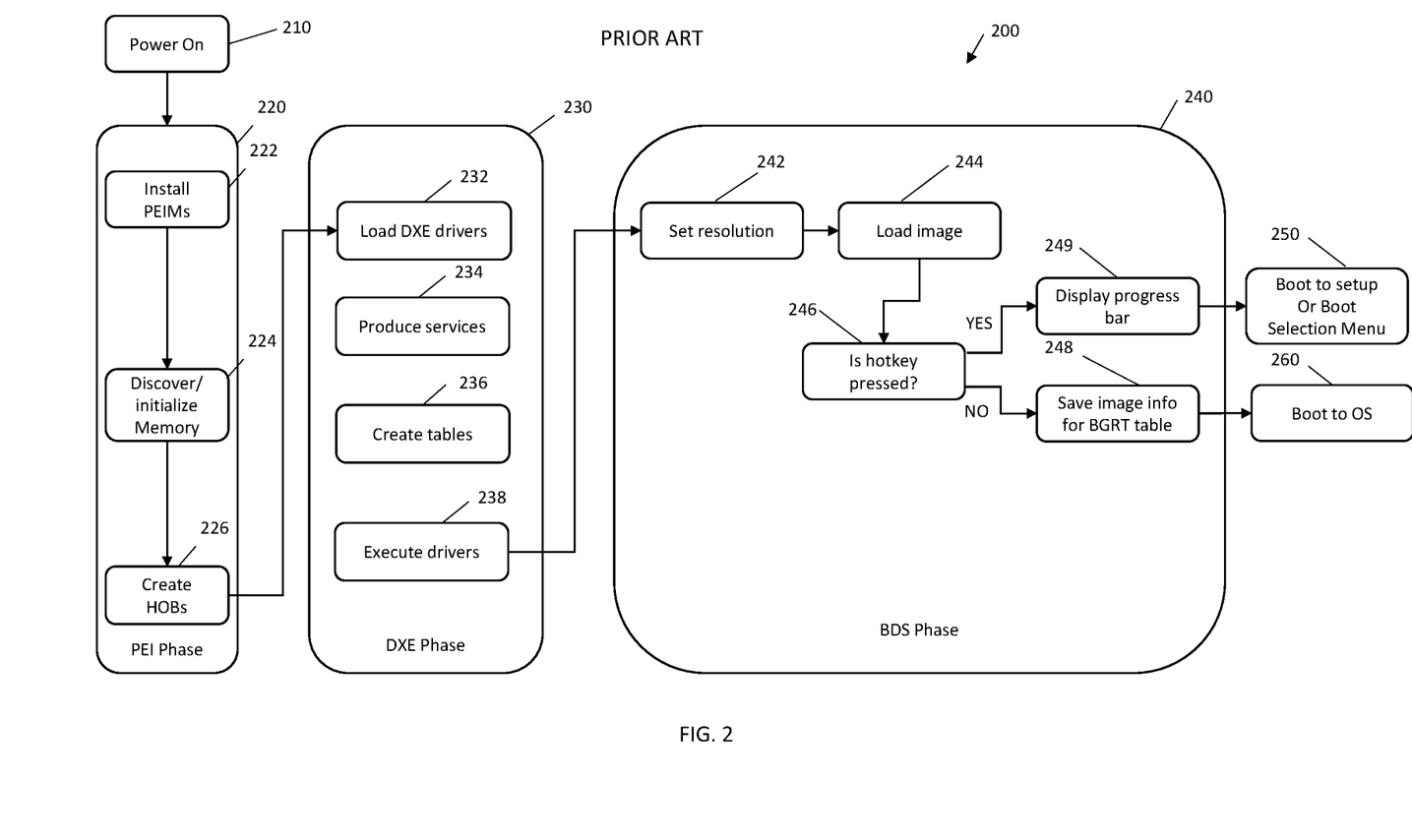
FIG. 2 is a flow diagram depicting selected elements of a prior art platform initialization process.

To aid in understanding, a general description of a platform initialization process is described. FIG. 2 depicts a flow diagram illustrating a common platform initialization process 200. Platform initialization process 200 starts at step 210 with a person pushing a power button such that information handling system 100 enters PEI phase 220. In PEI phase 220, PEI modules (PEIMs) in information handling system 100 are installed by a PEI dispatcher to initialize permanent memory in step 222, discover memory and firmware volumes in step 224 and build position-independent data structures called Hand-Off Blocks (HOBs) in step 226. Generally, PEI phase 220 is intended to have the smallest possible set of PEI modules for memory initialization and capturing information to be passed to the Operating System (OS) during the DXE phase.

The state of information handling system 100 at the end of PEI phase 220 is passed to DXE phase 230 through a list of HOBs described in detail in a platform initialization HOB Specification. DXE phase 230 is the phase in a platform initialization process in which most of the system initialization is performed. Permanent memory initialized in PEI phase 220 allows DXE drivers to be loaded in step 232. A DXE core produces a set of services in step 234, including boot services, runtime services, and DXE services, and creates tables identifying boot and runtime services in step 236. A DXE driver is loaded by the DXE core to perform initialization and/or produce protocols and other services. DXE drivers are responsible for initializing the processor, chipset, and platform components as well as providing software abstractions for system services, console devices, and boot devices. A DXE dispatcher is responsible for discovering and executing DXE drivers in the correct order in step 238. The DXE dispatcher exits when it cannot find and dispatch any more drivers and invokes a Boot Device Selection (BDS) phase 240, but the runtime data structures allocated by a DXE core and services and data structures produced by runtime DXE drivers persist into an operating system (OS) runtime environment. The time needed for a typical information handling system to complete PEI phase 220 and DXE driver loading phase 230 can take 4-5 seconds, during which there is typically a blank (black) screen. It is during this time that users are most likely to wonder if information handling system 100 is operating properly.

After all the DXE drivers whose dependencies have been satisfied have been loaded, information handling system 100 enters BDS phase 240. During BDS phase 240, information handling system 100 implements a platform boot policy. The boot policy provides flexibility that allows system vendors to customize the user experience. BDS phase 240 is implemented as part of the BDS Architectural Protocol. In some embodiments, a DXE Foundation (not shown) in DXE phase 230 will hand control to the BDS phase 240 after all of the DXE drivers whose dependencies have been satisfied have been loaded and executed by the DXE Dispatcher. In BDS phase 240, a resolution mode is set in step 242 to determine a resolution for an image, the image is loaded based on the native resolution identified by information handling system 100 and an image page is flushed in step 244. These steps of BDS phase 240 needed to process the image can last another second. Thus, a user might not see the first instance of a logo until approximately 6-8 seconds after pushing the power button. This delay in seeing an image can be problematic because, when presented with a blank screen, users may wonder if information handling system 100 is powered on. Additionally, during this portion of BDS phase 240, there may be screen flicker, which may be caused by screen resets, resizing of the image to fit a particular screen resolution or other normal system processing. It is during this time when users see the screen flickering that they may wonder if the system is operating properly.

Also, during BDS phase 240, information handling system 100 checks to see if a hotkey is pressed in step 246. If information handling system 100 determines no hotkey is pressed, information handling system 100 saves the processed image for a Boot Graphics Resource Table (BGRT) to consume at step 248 and at step 260 information handling system 100 proceeds to boot an OS. If information handling system 100 determines a hotkey was pressed, then at step 249 a progress bar is displayed and information handling system 100 either boots to setup or boots to a boot selection menu in step 250.

During the time information handling system 100 is assessing whether a hotkey was pressed and how to proceed, information handling system 100 continues to load and may start displaying an image. However, due to other processing requirements and constraints, the process of displaying an image can be delayed, there may be additional flickering, or information handling system 100 may otherwise be operating normally but gives the false perception that information handling system 100 is not operating properly.

Embodiments disclosed herein allow an image or logo to be displayed throughout a platform initialization process without the expense or other shortcomings of the above-mentioned approaches. In embodiments disclosed herein, during an initial platform initialization process, information handling system 100 builds and stores a logo screen in a BDS phase and stores the image in firmware, such that during subsequent platform initialization processes, processed image HOB data is retrieved early in a PEI phase. The result is that an image already processed for native resolution can be displayed approximately two seconds after the power button is pressed and the image can be displayed continuously from the PEI phase through the BDS phase, which reduces processing time during subsequent BDS phases by skipping steps related to setting the resolution and clearing the screen, and the processed image HOB data can be updated and stored in firmware volumes for subsequent platform initialization processes.

Figure 3:
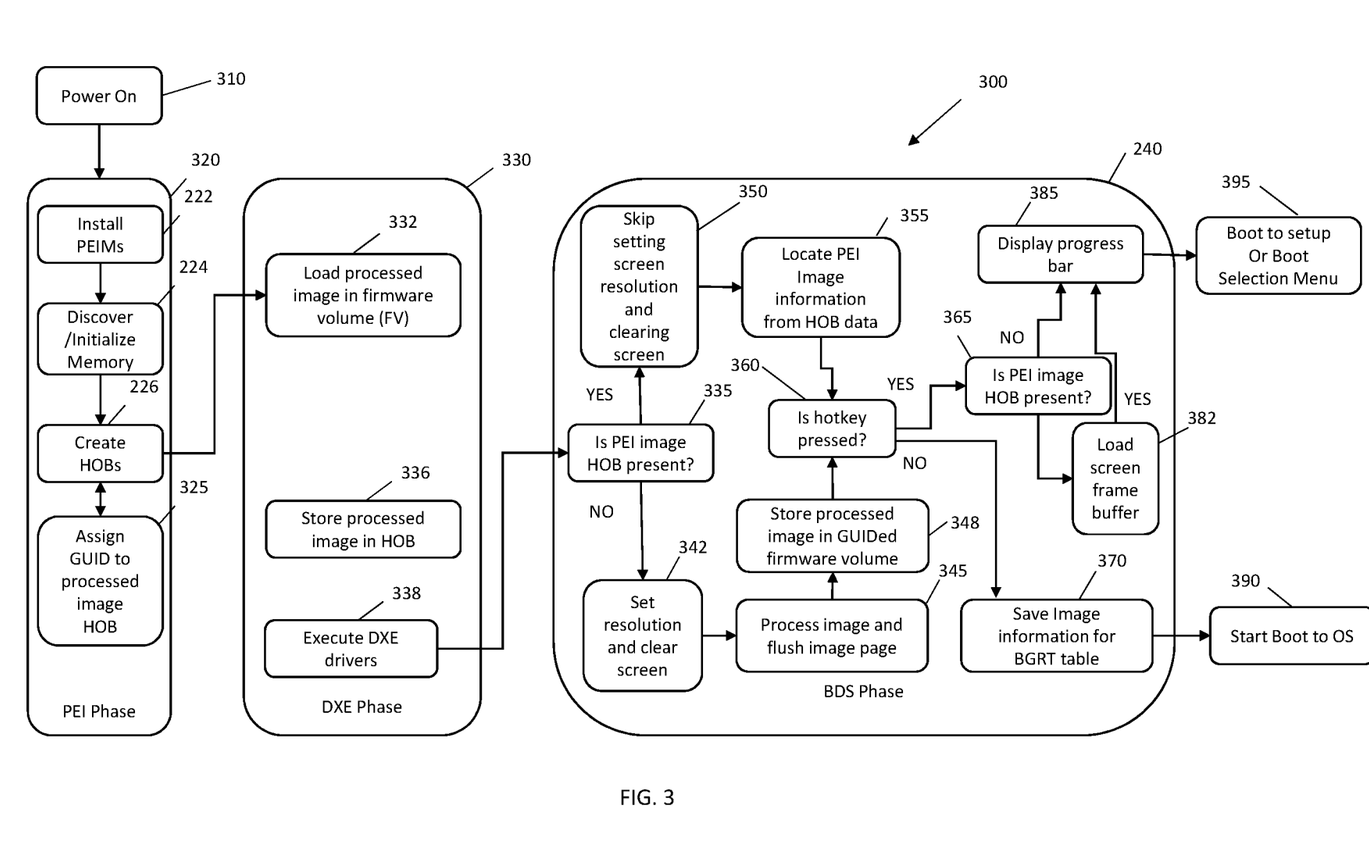
FIG. 3 is a flow diagram depicting selected elements of one embodiment of a method for displaying an image throughout a platform initialization process.

FIG. 3 is flow diagram illustrating one embodiment of a platform initialization process. Embodiments of platform initialization process 300 are adapted for processing an image in an initial platform initialization process for displaying an image early in subsequent platform initialization processes and maintaining the display throughout the platform initialization processes. Embodiments are configured for execution on different information handling system configurations.

Platform initialization process 300 is initiated at step 310 when information handling system 100 is powered on, such as by a person pushing a power button. When power is first applied, information handling system 100 enters PEI phase 320. In PEI phase 320, PEIMs in information handling system 100 are installed by a PEI dispatcher to initialize permanent memory, discover memory and firmware volumes and build HOBs.

In an initial execution of platform initialization process 300, no images are stored in the firmware volumes. However, during the initial execution of platform initialization process 300, embodiments store HOB data for a processed image in a firmware volume during BDS phase 340 such that, during subsequent executions of PEI phase 320 of platform initialization process 300, the HOB data is retrieved from the firmware volumes and displayed, and HOB data is maintained in the firmware volumes for passing to the DXE phase 330. In some embodiments, in step 325, information handling system 100 creates and assigns a GUID to a PEI image HOB associated with the processed image. The GUID is 128 bits long and is generated by information handling system 100. Information handling system 100 describes the memory and firmware volume locations to a DXE phase 330 using the GUIDed HOBs.

During DXE phase 330, information handling system 100 loads DXE drivers in step 332, including loading HOB data associated with any processed images stored in firmware volumes. If there is a processed image stored in a firmware volume and passed from PEI phase 320 to DXE phase 330, DXE drivers load the processed image for native resolution of the panel. During DXE phase 330 of subsequent platform initialization processes, information handling system 100 stores the processed image in firmware volumes in step 336 before executing DXE drivers in step 338 for use during BDS phase 340.

Once information handling system 100 passes from DXE phase 330 to the BDS phase 340, in step 335 information handling system 100 checks to see if there is a PEI image HOB present in firmware volumes.

If there is no PEI image HOB present (such as when information handling system 100 is in an initial platform initialization process), information handling system 100 sets the native resolution for I/O 140 or external monitor 141 and clears the screen in step 342. Information handling system 100 sets the native resolution based on detected display settings. For example, if an image is to be displayed on external monitor 141, information handling system 100 sets the resolution based on the external monitor settings. Once the resolution is set and the screen is cleared, information handling system 100 processes the image and flushes an image page in step 345, and stores HOB data for the processed image in a GUIDed firmware volume in step 348 such that, during PEI phase 320 of subsequent platform initialization processes, information handling system 100 discovers the processed image in firmware volumes for faster displaying of the processed image.

If information handling system 100 has already executed an initial platform initialization process, then a PEI image HOB will be present when information handling system 100 checks in step 335. If information handling system 100 processed the image in a previous platform initialization process, the resolution for the image is already set for I/O system 140 and the image is already flushed. Accordingly, information handling system 100 can skip setting the resolution and clearing the screen (noted as step 350) and execute step 355, which involves locating the PEI image information from the HOB data to allow information handling system 100 to continue displaying the processed image. Advantageously, the ability to locate the PEI image HOB allows a logo or other image to be displayed quickly and seamlessly throughout a platform initialization process leads to a positive user experience.

In step 360, information handling system 100 determines if a user has pressed any of the hotkeys that could cause information handling system 100 to exit BDS phase 340. For example, a user might press a hotkey to enter the Basic Input/Output System (BIOS) of information handling system 100.

If no hotkey is pressed, then in step 370, information handling system 100 saves image information for a Boot Graphics Resource Table (BGRT), which is a table to indicate that the image was displayed during BDS phase 340. BGRT is written when the image is displayed, and usually is performed after any other firmware components that may write to the screen are finished such that the image is the only image displayed. Fields in the BGRT allow for correct placement and positioning of an image on a screen.

If information handling system 100 determines a hotkey has been pressed, information handling system 100 determines in step 365 if there is a PEI image HOB present. If no PEI image HOB is present, information handling system 100 displays a progress bar in step 385 and boots to setup or boot a selection menu in step 395. If there is an image present, information handling system 100 loads a screen frame buffer and creates an image page in step 382, displays a progress bar in step 385, and boots to setup or boots a selection menu in step 395.

Figure 4:
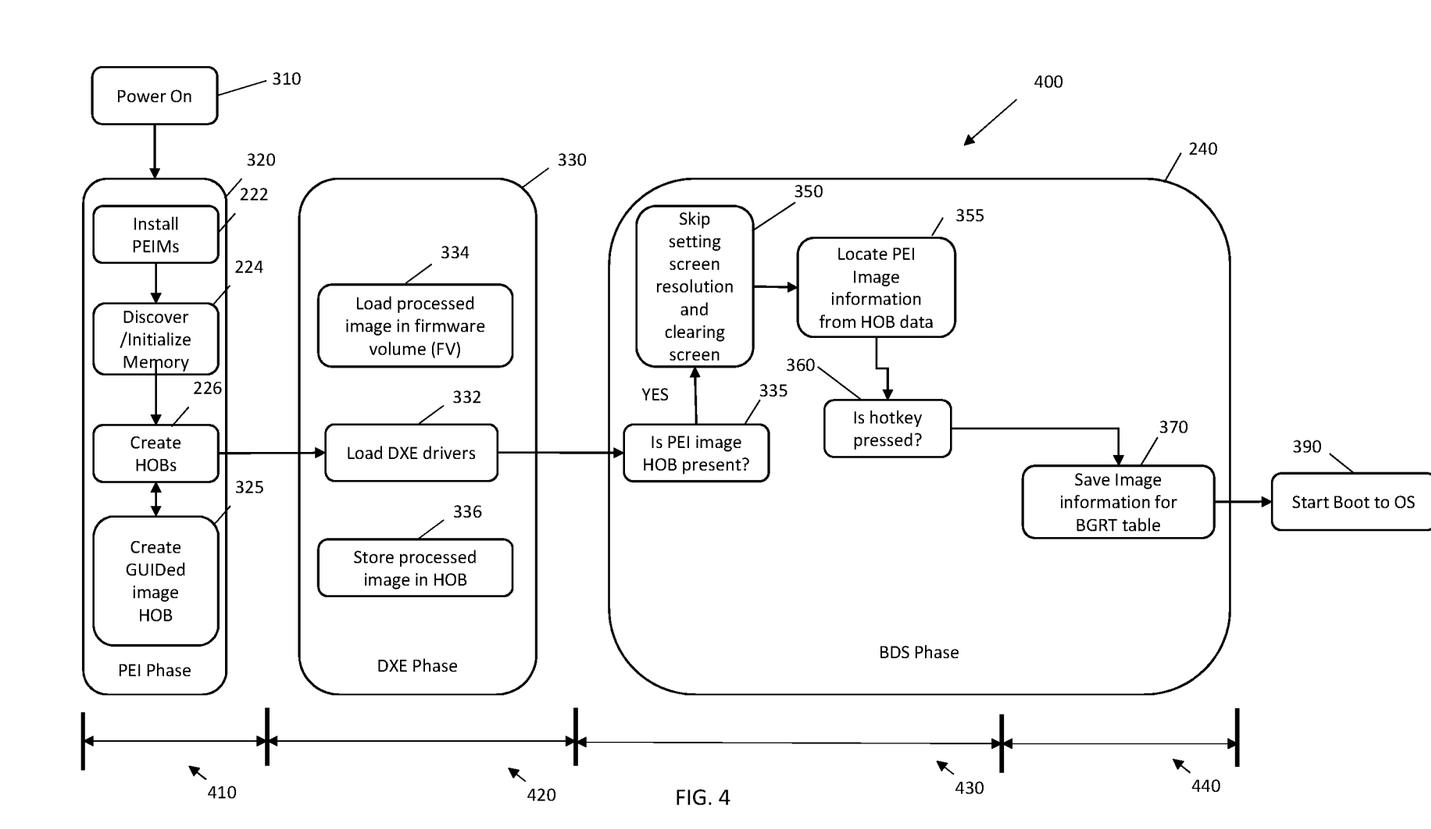
FIG. 4 is a flow diagram depicting selected elements of one embodiment of a method for displaying an image in a platform initialization process.
Figure 5:
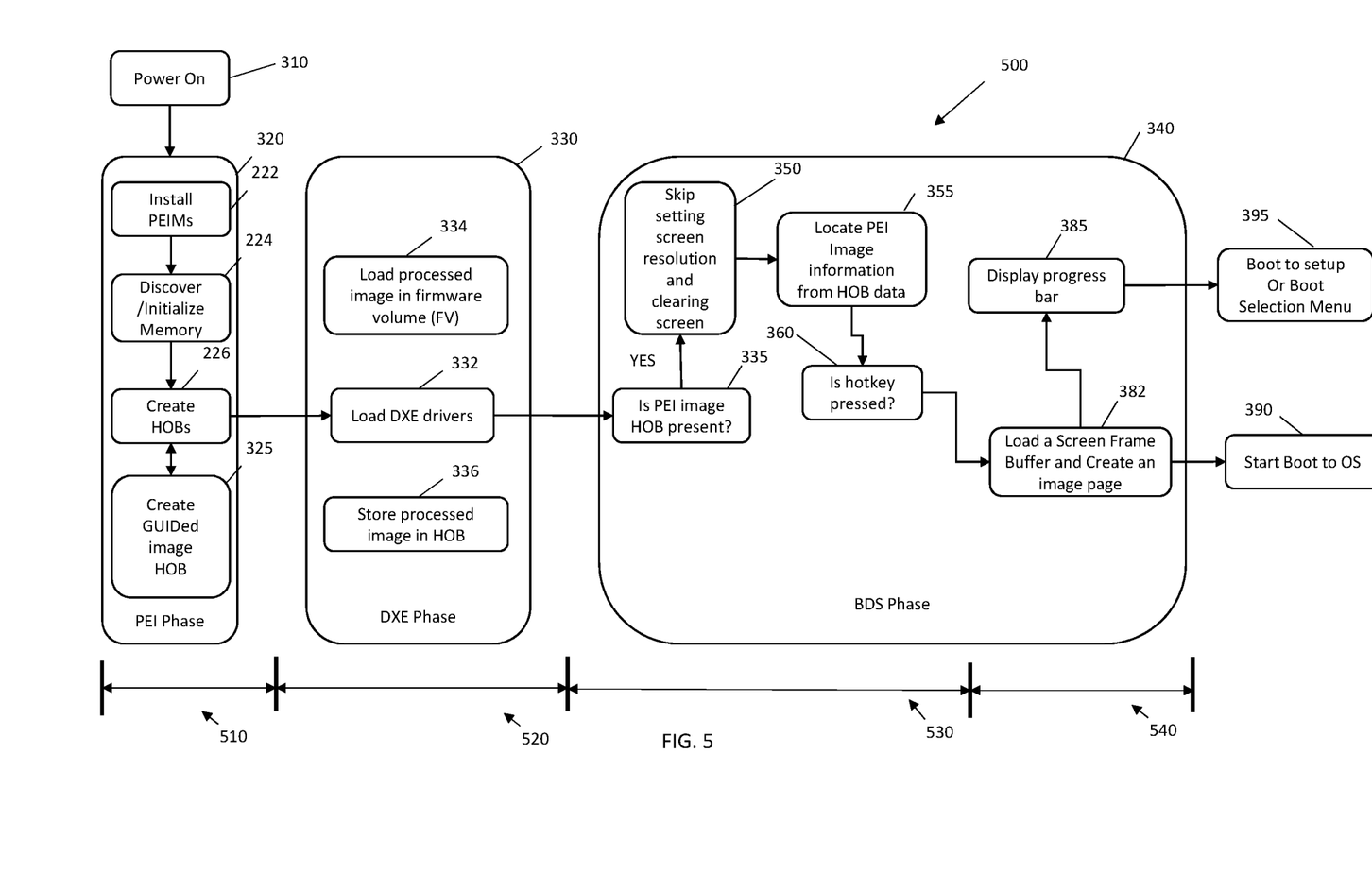
FIG. 5 is a flow diagram depicting selected elements of one embodiment of a method for displaying an image in a platform initialization process.

FIGS. 4 and 5 depict flow diagrams relative to timelines, illustrating selected steps in platform initialization process 300 depicted in FIG. 3 and the reduction in time needed to display an image on information handling system 100. In particular, FIG. 4 depicts a flow diagram of a process for booting to an OS and FIG. 5 depicts a flow diagram of a process for booting to a pre-boot user interface (UI).

Platform initialization process 400 depicted in FIG. 4 begins when a person pushes a power button 210, which initializes PEI Phase 320. This portion 410 of platform initialization process 400 takes approximately 2 seconds to complete, during which time HOB data for a processed image is discovered and information handling system 100 can start displaying an image.

Once information handling system 100 enters BDS phase 340 and in step 335 determines there is a PEI image present, information handling system 100 skips setting the resolution and clearing the screen (step 350). Information handling system 100 locates and processes the HOB data and stores the processed image in a GUIDed firmware volume in step 450. This sequence of steps reduces the time needed to complete BDS phase 400 by approximately 800 ms. Information handling system 100 checks if a hotkey has been pressed in step 360. If not, information handling system 100 saves the image information for a BGRT to consume in step 370.

Information handling system 100 needs approximately 2 seconds to complete PEI phase 320 (represented by timeline section 410) during which an image is displayed. In contrast, prior art approaches typically do not display an image until the end of timeline section 440, which includes approximately 1 second to complete DXE phase 330 and approximately 2 seconds to complete BDS phase 340 and start a boot to OS step 390, which may be 6-8 seconds after a start of the platform initialization process. Furthermore, by avoiding screen flicker and blank screens, embodiments presenting a consistent image early in the platform initialization process confirm user expectations that information handling system 100 is operating properly. Additionally, embodiments are executable in a wide range of information handling system configurations, including external monitors, and do not require TCON panels or other expensive or specialized hardware.

Platform initialization process 500 depicted in FIG. 5 begins when a person pushes a power button 210, which initializes PEI Phase 320. This portion 510 of platform initialization process 500 approximately 2 seconds to complete, during which time HOB data for a processed image is discovered and information handling system 100 can start displaying the processed image using I/O subsystem 140 and/or external monitor 141.

Once information handling system 100 enters BDS phase 340 and in step 335 determines there is a PEI image HOB present, information handling system 100 skips setting the resolution and clearing the screen (step 350). Information handling system 100 locates and processes the image using the PEI HOB data and stores the processed image in a GUIDed firmware volume in step 450. This sequence of steps reduces the time that information handling system 100 needs to complete timeline section 520 of BDS phase 340 by approximately 800 ms. In contrast, prior art approaches typically do not display an image until the end of timeline section 540, which may be 6-8 seconds after a start of the platform initialization process.

Information handling system 100 checks if a hotkey has been pressed in step 360. If a hotkey has been pressed, information handling system 100 loads a Screen Frame Buffer and creates an image page in step 565 and displays a progress bar in step 385. Information handling system 100 needs approximately 2 seconds to complete these two steps before exiting BDS phase 340 and starts a display for a setup or boot selection menu in step 395. This sequence of steps reduces the time that information handling system 100 needs to complete timeline section 530 of BDS phase 340 by approximately 200 ms.

Thus, instead of needing approximately 6-8 seconds to display an image (including 3-4 seconds to process through BDS phase 340), embodiments are able to load a processed image in PEI phase 320 to display an image in approximately 2 seconds and BDS phase 340 may be executed in only 1-2 seconds, providing a better user experience. Furthermore, by avoiding screen flicker and blank screens, embodiments present a consistent image early in the platform initialization process to confirm user expectations that information handling system 100 is operating properly. Additionally, embodiments are executable in a wide range of information handling system configurations, including external monitors, and do not require TCON panels or other expensive or specialized hardware.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

A person of ordinary skill in the art will appreciate that information handling system 100 is merely illustrative and is not intended to limit the scope of the disclosure described herein. In particular, any computer system and/or device may include any combination of hardware or software capable of performing certain operations described herein. For instance, although information handling system 100 is illustrated following a first type architecture, various systems and methods described herein may be adapted to work with any other architecture having a different chipset. In addition, the operations performed by the illustrated components may, in some embodiments, be performed by fewer components or distributed across additional components. Similarly, in other embodiments, the operations of some of the illustrated components may not be performed and/or other additional operations may be available.

In other implementations, one or more of the devices or components shown in FIG. 1 may be absent, or one or more other components may be added. Accordingly, systems and methods described herein may be implemented or executed with other computer system configurations.

In the above described flow charts, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated. For the purposes of this disclosure, computer-readable media may include an instrumentality or aggregation of instrumentalities that may retain data and/or instructions for a period. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A computer implemented method for displaying an image on an information handling system throughout a platform initialization process, the method comprising:

setting a native resolution for an image based on a display panel;
clearing the display panel;
processing image information for native resolution of the image to the display panel;
storing the processed image information in a firmware volume;
in subsequent platform initialization processes:
in a Pre-Extensible Firmware Interface (EFI) Initialization (PEI) phase:
identifying a processed image in the firmware volume;
loading the processed image from the firmware volume;
displaying the processed image matching a current active panel; and
storing a Hand-Over Block (HOB) associated with the processed image;
in a Driver Execution Environment (DXE) phase:
receiving the HOB associated with the processed image from the PEI phase;
executing a DXE driver to continue displaying the processed image; and
storing the HOB associated with the processed image in the firmware volume;
in a Boot Device Selection (BDS) phase:
locating image information from the HOB associated with the processed image;
processing the image information from the HOB associated with the processed image to continue displaying the processed image; and
storing image information for the processed image in the firmware volume.

2. The method of claim 1, further comprising:
in each BDS phase:
determining if a hotkey is pressed;
if no hotkey is pressed, saving image information to a Boot Graphics Resource Table (BGRT);
if a hotkey is pressed:
loading a screen frame buffer;
creating an image page; and
processing the image for native resolution to the display panel.

3. The method of claim 1, wherein
the information handling system is coupled to an external monitor, wherein the method comprises displaying the image on the external monitor.

4. The method of Claim 1 further comprising:
creating a Globally Unique Identifier (GUID) for the image HOB.

5. The method of claim 1, further comprising:
saving the HOB information to a Boot Graphics Resource Table (BGRT) before exiting the BDS phase.

6. The method of claim 1, further comprising:
loading a screen frame buffer;
creating an image page; and
displaying a progress bar before exiting the BDS phase.

7. The method of claim 1, wherein:
the display panel comprises a Timing Controller (TCON) panel.

8. An information handling system comprising a processor, a memory subsystem adapted to store firmware volumes and an I/O subsystem comprising a display panel, wherein the processor is configured to perform:
setting a native resolution for an image based on a display panel;
clearing the display panel;
processing image information for native resolution of the image to the display panel;
storing the processed image information in a firmware volume;
in subsequent platform initialization processes:
in a Pre-Extensible Firmware Interface (EFI) Initialization (PEI) phase:
identifying a processed image in the firmware volume;
loading the processed image from the firmware volume;
displaying the processed image matching a current active panel; and
storing a Hand-Over Block (HOB) associated with the processed image;
in a Driver Execution Environment (DXE) phase:
receiving the HOB associated with the processed image from the PEI phase;
executing a DXE driver to continue displaying the processed image; and
storing the HOB associated with the processed image in the firmware volume;
in a Boot Device Selection (BDS) phase:
locating image information from the HOB associated with the processed image;
processing the image information from the HOB associated with the processed image to continue displaying the processed image; and
storing image information for the processed image in the firmware volume.

9. The system of claim 8, wherein the processor is further configured to perform:
in each BDS phase:
determining if a hotkey is pressed;
if no hotkey is pressed, saving image information to a Boot Graphics Resource Table (BGRT);
if a hotkey is pressed:
loading a screen frame buffer;
creating an image page; and
processing the image for native resolution to the display panel.

10. The system of claim 8, wherein the information handling system is coupled to an external monitor, wherein the processed image is displayed on the external monitor.

11. The system of claim 8, wherein the processor is further configured to perform:
creating a Globally Unique Identifier (GUID) for the image HOB.

12. The system of claim 8, wherein the processor is further configured to perform:
saving the HOB to a Boot Graphics Resource Table (BGRT) before exiting the BDS phase.

13. The system of claim 9, wherein the processor is further configured to perform:
loading a screen frame buffer;
creating an image page; and
displaying a progress bar before exiting the BDS phase.

14. The system of claim 8, wherein:
the display panel comprises a Timing Controller (TCON) panel.

15. At least one non-transitory, computer-readable medium storing program instructions that when executed by a processor causes the processor to perform:
in a first platform initialization process in a Boot Device Selection (BDS) phase:
setting a native resolution for an image based on a display panel;

clearing the display panel;
processing image information for native resolution of the image to the display panel; and
storing the processed image information in a firmware volume; and in subsequent platform initialization processes:
in a Pre-Extensible Firmware Interface Initialization (PEI) phase:
  identifying a processed image in the firmware volume;
  loading the processed image from the firmware volume;
  displaying the processed image matching a current active panel; and
  storing a Hand-Over Block (HOB) associated with the processed image;
in a Driver Execution Environment (DXE) phase:
  receiving the HOB associated with the processed image from the PEI phase;
  executing a DXE driver to continue displaying the processed image; and
  storing the HOB associated with the processed image in the firmware volume;
in a Boot Device Selection phase:
  locating image information from the HOB associated with the processed image;
  processing the image information from the HOB associated with the processed image to continue displaying the processed image; and
  storing image information for the processed image in the firmware volume.

16. The non-transitory, computer-readable medium of claim 15, wherein:
the information handling system is coupled to an external monitor, wherein the image is displayed on the external monitor.

17. The non-transitory, computer-readable medium of claim 15, wherein:
one or more of the information handling system monitor and the external monitor comprises a bitmap-enabled Timing Controller (TCON) panel.

18. The non-transitory, computer-readable medium of claim 15, wherein:
in each BDS phase:
  determining if a hotkey is pressed;
  if no hotkey is pressed, saving image information to a Boot Graphics Resource Table (BGRT);
  if a hotkey is pressed:
    loading a screen frame buffer;
    creating an image page; and
    processing the image for native resolution to the display panel.

* * * * *